Aug. 30, 1949.  W. L. DEIBERT  2,480,226
CUTTING TOOL
Filed March 25, 1946
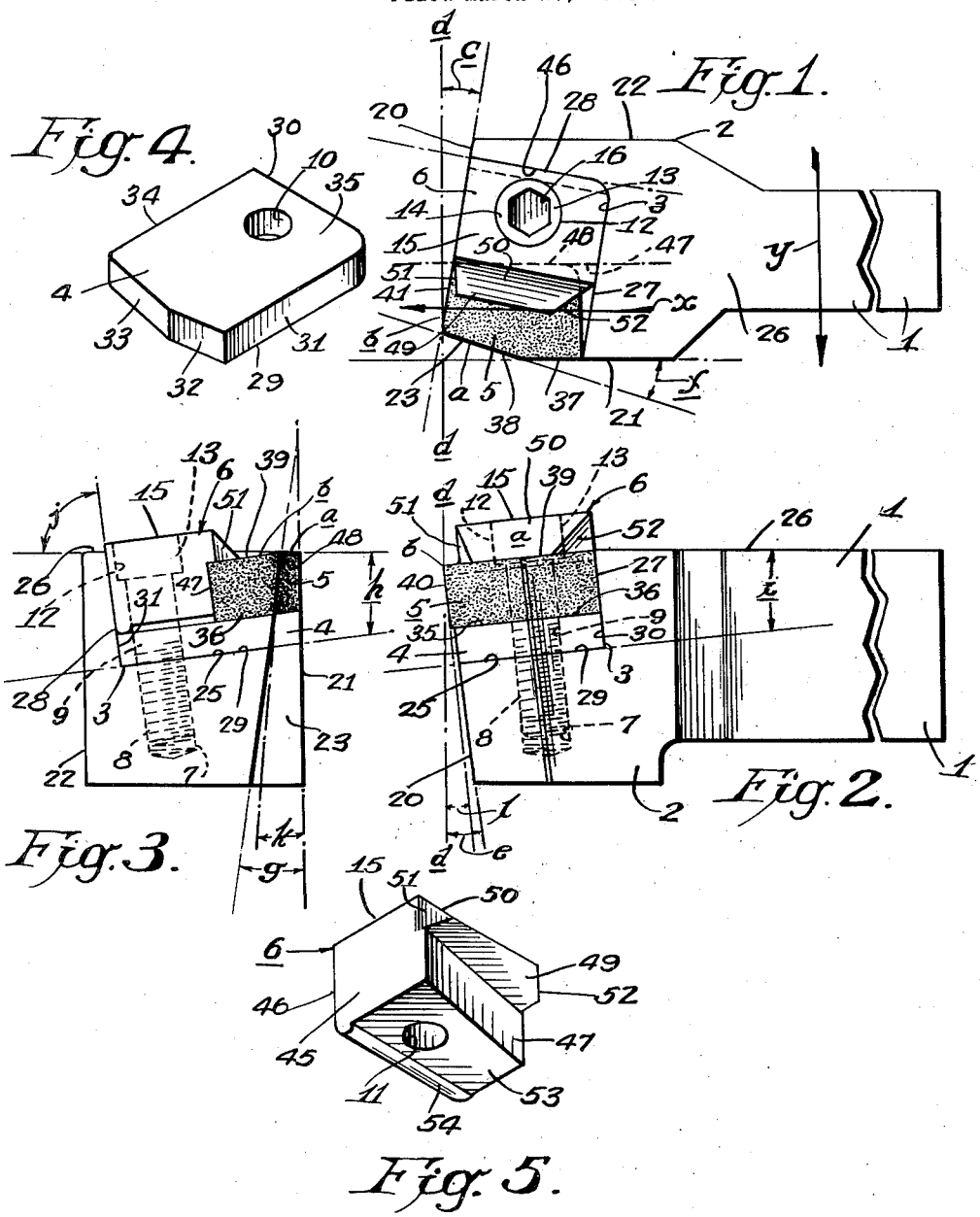
Inventor,
William L. Deibert
by his Attorneys
Howson + Howson Patented Aug. 30, 1949

2,480,226

UNITED STATES PATENT OFFICE 2,480,226

CUTTING TOOL

William L. Deibert, Philadelphia, Pa., assignor to Carey-McFall Company, Philadelphia, Pa., a corporation of Pennsylvania Application March 25, 1946, Serial No. 656,942

3 Claims. (Cl. 29—96)

This invention relates to cutting tools of the type known as "clamp-on" tools, wherein a superhard tip is detachably secured to a tough steel shank by a clamp plate, through the medium of a clamping bolt passing through the plate and threaded into the shank, or vice versa.

The tool of the present invention constitutes an improvement over the tools now available on the market and embodies a number of structural features not heretofore known to the art.

In the accompanying drawing:

Fig. 1 is a plan view of a tool constructed in accordance with the principles of the present invention;

Fig. 2 is a side elevation of the tool shown in Fig. 1;

Fig. 3 is a front end elevation of the tool shown in Figs. 1 and 2; and

Figs. 4 and 5 respectively illustrate perspective views of details of the tool shown in Figs. 1, 2 and 3.

As shown in Figs. 1, 2 and 3, the tool of the present invention comprises a shank 1 which is preferably composed of a tough grade of steel known in the art as "shank steel" and which, as such, is obtainable on the open market.

The shank 1 is provided with an enlarged head 2, in the present instance, which is recessed at 3 to receive a hardened seating block 4, a superhard tip or bit 5, and a clamp block 6.

The head 2 is bored and tapped at 7, within the recess 3, to receive the threaded shank 8 of a clamp bolt 9. The clamp block 6 and the hardened seating block 4 are bored, at 10 and 11 respectively, to receive the shank 8 of the clamp bolt 9. The clamp block 6 is counterbored at 12 to receive an enlarged cylindrical head 13 formed on the clamp bolt 9, with the end face 14 of the bolt head 13 substantially flush with the top face 15 of the clamp block 6. The head 13 of the clamp bolt 9 is provided with a polygonally-sided socket 16 for reception of a similarly shaped wrench (not shown) by which the bolt 9 may be loosened and tightened.

The shank 1 of the tool, as noted above, is composed of shank steel stock as obtainable on the open market with a Rockwell test rating of approximately C-35. The seating block 4, in the present instance, is preferably composed of hardened tool steel having a Rockwell rating of approximately C-67. The clamp block 6 is preferably composed of machine steel and tipped or faced with "Stellite" to resist wear by work chips.

The purpose of the hardened seating block 4 is to provide a hard seating surface beneath the tungsten-carbide tip or bit 5 to increase the span of the useful life of the tungsten-carbide bit 5.

By providing the hardened seating block 4 beneath the cutting bit 5, the necessity for hardening the entire head 2 of the shank, with a consequent high percentage of spoilage, is entirely eliminated. The commercial shank steel may be used with entire satisfaction without the expense involved in hardening the head of the shank to provide a satisfactory hard seat for the tool bit.

Horizontally, as shown in Fig. 1, the front face 20 of the head 2 is formed at an angle $c$ of substantially 15° to a plane $d$—$d$ lying at right angles to the axis of the shank 1 and the parallel side edges 21 and 22 of the head 2.

Vertically, as shown in Fig. 2, the front face 20 of the head 2 is formed at a rearwardly receding angle $e$ of substantially 8° to the transverse plane $d$—$d$.

The advance side face 21 of the head 2, as shown in Fig. 1, is cut off, adjacent the front face 20, at an angle $f$ of substantially 15° with respect to the side face 21, as shown in plan at 23, and as shown in front elevation in Fig. 3, the angular advance face 23 is disposed, vertically, at an angle $g$ of substantially 8° with respect to the advance side face 21 of the head 2.

The recess 3 in the head 2 is formed with its floor 25 inclined, transversely of the head 2, at an angle $h$ of substantially 6° to the plane of the top face 26 of the head 2. The top face 26 of the head 2 lies in a plane parallel to the axis of the shank 1 and head 2.

Longitudinally of the head 2, the floor 25 of the recess 3 lies in a plane inclined at an angle $i$ of substantially 5° to the plane of the top face 26 of the head 2.

The rear wall 27 of the recess 3 lies substantially parallel to the front end wall 20 of the head 2. The trailing side wall 28 of the recess 3 lies at an angle $j$ of 84° to the top surface 26 of the head 2. Both the rear wall 27 and the side wall 28 of the recess 3 are disposed at 90° each to the plane of the floor 25 of the recess 3.

The seating block 4 is of substantially uniform thickness throughout its entire area and lies with its under surface 29 in flat contact with the floor 25 of the recess 3, and with its rear edge 30 and trailing side edge 31 in firm abutting contact with the rear wall 27 and trailing side wall 28 of the recess 3.

The advance side edge 32 of the block 4 is cut at an angle corresponding to the angle $f$ of the advance side face 21—23 of the head 2, as illustrated at 33. The advance side face 32—33 of the seating block 4 is adapted to lie substantially flush with the advance side face 21—23 of the head 2.

The front end face 34 of the seating block 4 is adapted to lie substantially flush with the front end face 20 of the head 2.

The bit 5 is adapted to lie on the upper surface 35 of the seating block 4, with the underside 36 of the bit 5 seated firmly and uniformly over its entire area on the top face 35 of the seating block 4.

The bit 5 is of substantially uniform thickness throughout its entire area and is provided with an advance side face 37—38 corresponding to and adapted to lie substantially flush with the advance side face 21—23 of the head 2 and the advance side face 32—33 of the seating block 4.

The downward 6° tilt of the floor 25 of the recess 3 as represented by the angle $h$, Fig. 3, toward the trailing side 22 of the head 2, and the corresponding downward tilt of the seating block 4 and bit 5, in coordination with the 8° undercutting of the advance side faces 21—23 of the head 2 and 32—33 of the seating block 4 as represented by the angle $g$, Fig. 3 together with a corresponding 6° undercutting of the advance side face 37—38 of the bit 5, as represented by the angle $k$, Fig. 3, provides a main said cutting edge $a$ on the bit 5, where the top face 39 of the bit 5 intersects the side face 37—38 of the bit 5. The underlying flush side faces of the seating block 4 and head 2 affords vertical support for the bit 5 directly under the cutting edge $a$.

The front end face 40 of the bit 5 lies substantially flush with the front end face 34 of the underlying seating block 4. The 5° upward inclination of the floor 25 of the recess 3 toward the rear of the head 2, as represented by the angle $i$, Fig. 2, and the corresponding inclination of the seating block 4, coordinately with the 8° undercut of the front face 20 of the head 2 and face 34 of the seating block 4, as represented by the angle $e$, Fig. 1, together with the 6° undercut of the front face 40 of the bit 5, as represented by the angle $l$, Fig. 2, provides an end cutting edge $b$ where the front face 40 of the bit 5 intersects the top face 39 of the bit 5.

From the foregoing, and upon reference to Figs. 2 and 3 respectively, it will be noted that the main cutting edge $a$ has a positive rake while the cutting edge $b$ has a negative rake, as a result of the transverse declination and longitudinal inclination of the floor 25 of the recess 3 and the corresponding compound tilt of the top face of the bit with respect to said cutting edges.

The bit 5 is held in position in the head 2 by the clamp block 6, as noted above, and, as the major portion of the cut in a piece of work is made by the side cutting edge $a$, the bit 5 is backed up to resist the thrust and pressure of the cutting operation by the body portion 45 of the block 6.

The body portion 45 is wedge-shaped in plan, as shown in Fig. 1, and includes a trailing wall 46 which bears against the trailing wall 28 of the recess 3.

The opposite advance wall 47 of the block 6 bears against trailing wall 48 of the bit 5. This backing-up wall 47 of the clamp block 6 lies parallel to the leading or advance side wall 21 of the head 2, as clearly shown in Fig. 1.

The clamp block 6 is provided with a flange or lip 49 which overhangs the backing-up surface 47 of the body 45 of the clamp block 6. For the purpose of chip clearance, the flange 49 is beveled transversely along the full length of the block 6, as shown at 50, and the two ends of the flange 49 are likewise beveled at 51 and 52 for like purposes.

Along its trailing side, parallel to and adjacent the wall 46 of the clamp block 6, the underside 53 of the block is provided with a rib 54 of semi-circular cross section which bears on the top surface 35 of the seating block 4, so that, when the clamp bolt 9 is pulled down tight, the tendency of the clamp block 4 is to rock forwardly on the rib 54 and force the flange or lip 49 down more tightly against the upper face 39 of the bit 5, thus clamping the bit 5 rigidly against the seating block 4.

When and if it becomes necessary to sharpen the cutting edges $a$ and $b$, the shank 1 may be left in the tool holder of the machine tool in which the device of the present invention is installed and the bit 5 may be removed by loosening the bolt 9. After sharpening, the bit 5 may be returned to position in the head 2 and adjustably axially, in the direction of the arrow X, Fig. 1, until the sharpened cutting edges $a$ and $b$ engage the work where the cutting operation ceased for the purpose of dressing the bit.

Accuracy in replacing the bit, so that no indication of the interruption in the cutting operation will appear in the work, is assured by reason of the backing-up surface 47 of the body portion 45 of the clamp block 6 being maintained in parallel relation to the axis of the shank 1 and head 2 as a result of the trailing surface 46 of the clamp block 6 being at all times in flat abutting contact with the trailing wall 28 of the recess 3.

In use, the tool is held in a suitable tool carrier or tool rest of a machine tool, such as a power lathe, and is advanced toward the work, in the direction of the arrow $y$, Fig. 1, with the side edge 21 leading or moving in advance and with the side edge 22 trailing, as the bit 5 cuts into the work, hence in the body of the foregoing specification and in the appended claims, the edge 21 of the head 2 and similar edges, etc., of the other parts of the device are referred to as the "advance" edges, etc., while the opposite edge 22 of the head 2 and similar edges, etc., of the various parts of the device are defined as "trailing," to distinguish these parts from each other more clearly.

I claim:

1. A metal cutting tool comprising a metal shank including a head portion having a recess in its upper face opening both endwise of the head and to a lateral face thereof, a hardened steel seating plate conforming substantially to the configuration of said recess removably disposed therein, a bit removably seated on said plate in the lateral and adjacent end edge portions thereof, a clamp block in said recess including a body portion disposed inwardly behind said bit in bearing engagement upon said plate and a portion disposed in overlying engagement upon said bit, and means passing through said block and plate and secured in said head for clamping said bit between said block and plate and to the shank head portion.

2. A metal cutting tool comprising a metal shank including a head portion having a recess in its upper face opening both endwise of the head and to a lateral face thereof, said recess having a plane floor provided with a tapped bore therein extending into the head normal to the plane of said floor, a hardened steel seating plate conforming substantially to the configuration of said recess removably disposed on the floor thereof and having a bore therethrough in registry with the tapped bore in said floor, a bit removably seated on said plate laterally outward from the bore therein, a clamp block in said recess including a body portion disposed inwardly behind said bit and a portion disposed in overlying engagement upon said bit, said clamp body portion bearing upon said plate and having a bore therethrough in alignment with the bore in said plate, and a clamp bolt passing through the bores in said block and plate and secured in said tapped bore in the head for clamping said bit between said block and plate and to the shank head portion.

3. A metal cutting tool comprising a metal shank including a head portion having a recess in its upper face opening both endwise of the head and to a lateral face thereof and defined by endwise and laterally facing walls, said recess having a plane floor and a tapped bore therein extending into the head normal to the plane of said floor, a hardened steel seating plate conforming substantially to the configuration of said recess removably disposed on the floor thereof and having a bore therethrough in registry with the tapped bore in said floor, a bit removably seated on said plate laterally outward of the bore therein, a clamp block in said recess including a body portion disposed between said laterally facing recess wall and the bit and a portion disposed in overlying engagement upon said bit, said clamp body portion having a projection on its under surface bearing upon said plate and having a bore therethrough in alignment with the bore in said plate, and a clamp bolt passing through the bores in said block and plate and secured in said tapped bore in the head for clamping said bit between said block and plate and to the shank head portion.

WILLIAM L. DEIBERT.

REFERENCES CITED

The following references are of record in the file of this patent:

UNITED STATES PATENTS

| Number | Name | Date |
|---|---|---|
| 2,140,941 | Reaney | Dec. 20, 1938 |
| 2,181,023 | Moore | Nov. 21, 1939 |
| 2,328,359 | Ramsdell | Aug. 31, 1943 |
| 2,392,285 | Gauthier | Jan. 1, 1946 |